United States Patent [19]

Weber

[11] Patent Number: 4,470,314

[45] Date of Patent: Sep. 11, 1984

[54] MEASURING APPARATUS OF THE VIBRATORY STRING TYPE

[75] Inventor: Peter Weber, Uerikon, Switzerland

[73] Assignee: Mettler Instrumente AG, Greifensee, Switzerland

[21] Appl. No.: 448,483

[22] Filed: Dec. 10, 1982

[30] Foreign Application Priority Data

May 11, 1982 [CH] Switzerland .......................... 2915/82

[51] Int. Cl.³ .............................................. G01L 1/10
[52] U.S. Cl. .............................. 73/862.59; 73/DIG. 1
[58] Field of Search .................... 73/DIG. 1, 704, 778, 73/517 AV, 862.59

[56] References Cited

U.S. PATENT DOCUMENTS

| | | | |
|---|---|---|---|
| 1,995,305 | 3/1935 | Hayes | 73/517 AV |
| 3,020,702 | 2/1962 | Feldman | 73/431 X |
| 3,621,713 | 11/1971 | Wirth et al. | |
| 3,712,395 | 1/1973 | Streater et al. | |
| 3,714,406 | 1/1973 | Clarke | 73/431 X |
| 3,897,681 | 8/1975 | Meier | |
| 3,963,082 | 6/1976 | Meier | |

*Primary Examiner*—Charles A. Ruehl
*Attorney, Agent, or Firm*—Laubscher, Philpitt & Laubscher

[57] ABSTRACT

Improved measuring apparatus of the vibratory string type including a molded synthetic plastic body member containing a horizontal through passage for receiving the permanent magnet excitation and sensing system, and a pair of integral parallel horizontal wing-like projections that extend from the body member in supporting relation on opposite sides of the exciting magnet system. The body member also contains a through bore arranged in spaced relation directly beneath the through passage, a rear recess being provided in the rear face of the body member for receiving clamping means having a bearing portion that extends through the through bore for connection with the lower end of the vertically arranged measuring string. Additional apertures are formed in the body member for connecting the same to a fixed support or console.

7 Claims, 3 Drawing Figures

MEASURING APPARATUS OF THE VIBRATORY STRING TYPE

BRIEF DESCRIPTION OF THE PRIOR ART

An improved measuring apparatus is disclosed of the known vibratory or oscillatory string type, as evidenced, for example by the prior U.S. patents to Wirth et al. No. 3,621,713, Streater et al. 3,712,395, and Meier Nos. 3,897,681 and 3,963,082, and the Swiss application No. CH 8198/81. Such instruments have utility as weighing devices (with one or more strings), as actual dynamometers, or as an instrument having a reference mass against which other masses are compared (i.e., a massmeter). In such measuring instruments, the load-change-responsive frequency variations produced in one or more strings that oscillate laterally in a magnetic field are measured and converted into a weighing result that is displayed (by digital display means, for example). String measuring type instruments are also used as an extensometer for measuring the change in the length of an object.

The measuring and design principle of string measurement instruments normally requires appreciable manufacturing and assembly effort if one wishes to achieve reproducible and reliable measurement results.

SUMMARY OF THE INVENTION

The primary object of the present invention is to provide an improved instrument of the vibratory string measuring type which is more readily and inexpensively assembled than the known devices without impairing the operational qualities of the instrument. To this end, it is proposed that the structural body component be a molded part formed of an electrically insulating synthetic plastic material, that it contain recesses for receiving the exciter magnet system as well as the support for the fixed end of the string, and it furthermore contains apertures for attachment to a console. This concept makes it possible, prior to the assembly of the entire instrument, to mount the pre-assembled actual structural component whose attachment in the instrument then only requires a few motions of the hand. The structural component according to the invention can, according to known techniques, be mass produced rather accurately in terms of the required dimensions, for example, by means of injection molding techniques.

According to another object of the invention, the apertures for attaching the body member to the console are perferably arranged asymmetrically relative to the vertically arranged measuring string, whereby the oscillation excitation of the attachment point, originating from the string, may be reduced (relative to the minimum excitation which is obtained in the case of a symmetrical arrangement of the perforation).

According to a further object of the invention, the rear face of the body member contains a recess that communicates with a through bore, clamping means being mounted in the recess which include a bearing portion that extends through the bore for connection with the lower end of the vertically arranged vibratory string. The demensions of the rear recess are such that the clamping means is isolated from the console or support to which the body member is attached, whereby the necessity of additional electrical insulation is avoided.

According to a further feature of the invention, the structural component, on its side remote from the console, includes protrusions for the lateral guidance of the exciter magnet system. The protrusions carry opposed lugs which form a stop for the exciter magnet system, said stop being remote from the console. In this way, a relatively simple and accurately dimensioned assembly of the exciter magnet system is achieved without the necessity of any further adjustment.

In accordance with a further feature of the invention, a covering hood, formed of synthetic plastic material, is fitted upon the shaped part to cover the exciter magnet system. This means that, in addition to a certain protection against dirt, an acoustic screen is also provided. As a further development of the basic concept, recesses are provided in the front face of the body member whch are used to fix the covering hood in place.

BRIEF DESCRIPTION OF THE DRAWING

Other objects and advantages of the invention will become apparent from a study of the following specification when viewed in the light of the accompanying drawing, in which.

DETAILED DESCRIPTION

Figure 1:
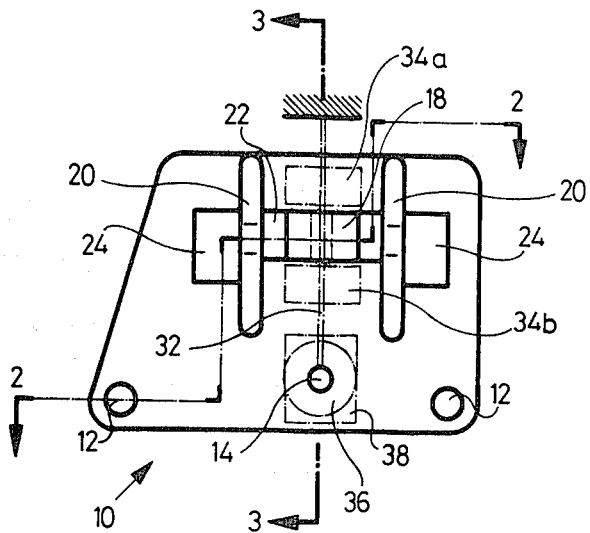
FIG. 1 is a front elevational view of the molded body member of the weighing apparatus of the present invention, with certain parts removed.
Figure 2:
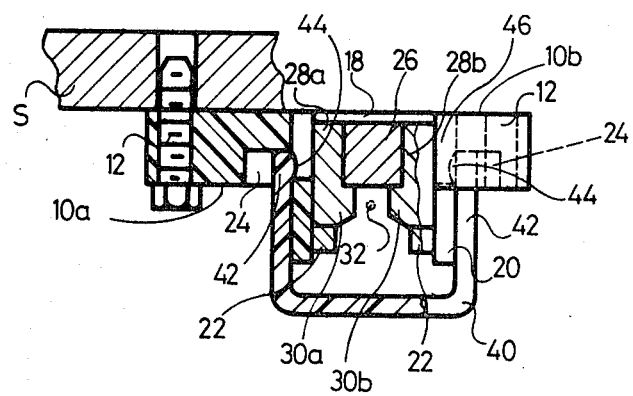
FIGS. 2 and 3 are sectional views taken along lines 2—2 and 3—3, respectively, of FIG. 1.
Figure 3:
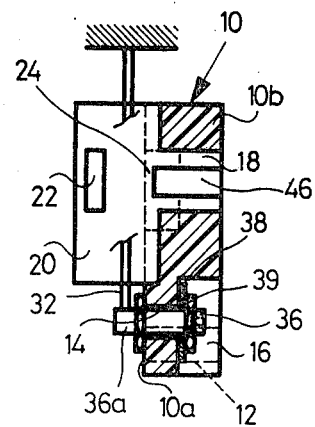

Referring now more particularly to the drawings, the string-type measuring apparatus includes a mounting block or body member 10 that is molded from a suitable synthetic plastic material (for example, a polyamide) having the configuration of a block with planar parallel front and rear surfaces 10a and 10b, respectively, and a slanted end portion. The body member contains a pair of apertures 12 by means of which the body member may be secured to a console or fixed support S, as shown in FIG. 2. The apertures 12 are asymmetrically arranged on opposite sides of the vertical plane illustrated by the line 3—3 in FIG. 1. The body member 10 contains a through bore 14 that communicates at one end with a recess 16 formed in the rear face 10b of the body member 10, as shown in FIG. 3. Mounted in the recess 16 are clamp means 36, 38 including a bearing portion 36a that extends forwardly through the bore 14 for connection with the lower end of the vertically arranged string 32. Arranged directly above the through bore 14 is a through passage 18 of rectangular cross-section. Arranged symmetrically on opposite sides of the rectangular passage 18 are a pair of integral vertically extending parallel spaced wing-like projections 20, the adjacent surfaces of which are provided a pair of inwardly projecting stop lugs 22, respectively. Adjacent the outer surfaces of the wing-like projections 20 there are provided in the forward face of body 10 a pair of recesses 24, respectively, said recesses having a depth of about one-half of the thickness of the body member 10.

If desired, additional recesses might be provided in the body member for purposes of strength and/or for mass production reasons.

The string-type measuring system includes an exciter magnet system that is inserted forwardly from the rear side of the body member 10 through the passage 18, as shown in FIG. 2. The exciter magnet means includes a permanent magnet 26, and a pair of ferromagnetic pole shoes 28a and 28b, respectively, which pole shoes extend forwardly beyond the permanent magnet 26 into abutting engagement with the stop lugs 22, respectively. The permanent magnet system may be adhesively secured to the body member 10 by means of a suitable adhesive. As shown in FIG. 2, the pole shoes 28a and 28b include inwardly extending barbed extensions 30a, 30b, respectively, that define stop means limiting the extent of forward displacement of the permanent magnet 26 relative to the body member 10. For the sake of clarity, permanent magnet 26 and pole shoes 28a, 28b have been omitted from FIG. 3. The barbed ends 30a and 30b define therebetween an air space in which the string 32 is mounted. THe string -- which is provided with conventional nodal masses 34a and 34b --extends upwardly from the bearing portion 36a and is secured at its upper end with a force transmission member (not shown in detail). The adjustable clamping means 36, 38 may be secured in place by means of the lock nut 39. The size of the recess 16 is such that the clamping means 36, 38 is electrically isolated by an airgap from the support or console S.

Referring again to FIG. 2, the instrument may include a generally U-shaped covering hood 40 made of a synthetic plastic material, which covering hood includes a pair of horizontally extending leg portions 42 that extend adjacent the outer surfaces of the wing-like projections 20 and terminate in the pair of front recesses 24. Thus, the covering hood 40 covers not only the permanent magnet exciter system but also the nodal masses 34a, 34b. The resilient tension between the leg portions 42 may be sufficient to maintain the cover 40 in the illustrated covering position of FIG. 2. Additionally, the ends of leg portions 42 may include inner projections 44 which resiliently snap into apertures 46 provided in body member 10 for retaining the hood 40 in position.

While the invention has been described for use in connection with a single string, it is apparent that, in accordance with the inventive concepts set forth above, a plurality of measuring strings could be provided for the molded body member.

While in accordance with the provisions of the Patent Statutes the preferred embodiment has been illustrated and described, it is apparent that various modifications may be made in the apparatus described without deviating from the inventive concepts set forth above.

What is claimed is:

1. Measuring apparatus of the vibratory string type, comprising
    (a) a mounting block (10) having generally vertical front and rear faces (10a, 10b), said mounting block containing a pair of vertically spaced through passages (14, 18) extending between said front and rear faces, said mounting block rear face containing a rear recess (16) communicating with one (14) of said through passages, said mounting block also containing at least two fastening apertures (12) for receiving fastening elements for connecting said mounting block with a fixed support;
    (b) a vibratory measuring string element (32) arranged vertically adjacent and spaced from said front face opposite said through passages;
    (c) clamping means (36, 38, 39) mounted in said one through passage for connecting one end of said string element with said mounting block, said clamping means being connected at one end with said string element and terminating at its other end in said rear recess in isolated relation relative to the fixed support; and
    (d) permanent magnet exciter means (26, 28a, 28b) mounted in the other one (18) of said through passages for exciting the string to produce vibrations therein.

2. Apparatus as defined in claim 1, wherein said fastening apertures are asymmetrically arranged on opposite sides of the plane which contains the string and extends normal to said mounting block front face.

3. Apparatus as defined in claim 1, wherein said mounting block includes a pair of parallel spaced wing-like support portions (20) that extend forwardly from and normal to said mounting block front face on opposite sides of said other through passage for laterally supporting said permanent magnet exciter means.

4. Apparatus as defined in claim 3, and further including a pair of opposed stop lugs (22) mounted on the adjacent surfaces of said support portions adjacent the free extremities thereof, thereby to limit the extent of displacement of said permanent magnet exciter means in the direction extending outwardly from said mounting block front face.

5. Apparatus as defined in claim 3, and further including a covering hood (40) formed of synthetic plastic material, and means connnecting said covering hood with said mounting block to at least partially enclose said permanent magnet exciter means.

6. Apparatus as defined in claim 5, wherein said covering hood is generally U-shaped in cross-section and includes a pair of parallel leg portions (42) that extend contiguously against the outer surfaces of said wing-like support portions, respectively, the free extremities of said leg portions terminating in corresponding recesses (24) contained in the front face of said mounting block.

7. Apparatus as defined in claim 6, and further including a pair of locking projections (44) mounted on the adjacent surfaces of said leg portions adjacent the free ends thereof, respectively, for engagement with corresponding locking recesses contained on the walls of said front face recesses.

* * * * *